United States Patent

[11] 3,585,516

[72] Inventor Angelo F. Ricagni
Milan, Italy
[21] Appl. No. 856,404
[22] Filed Sept. 9, 1969
[45] Patented June 15, 1971
[73] Assignee Automatic Electric Laboratories, Inc.
Northlake, Ill.

[54] ALL PASS NETWORK FOR PHASE EQUALIZERS OF WIDE BAND COMMUNICATION SYSTEMS
6 Claims, 4 Drawing Figs.

[52] U.S. Cl. .......... 330/30, 330/124
[51] Int. Cl. .......... H03f 3/68
[50] Field of Search .......... 330/14, 20, 30, 55, 124; 333/11, 17

[56] References Cited
UNITED STATES PATENTS

| | | | |
|---|---|---|---|
| 3,360,739 | 12/1967 | Cooke-Yarborough...... | 330/20 X |
| 3,423,688 | 1/1969 | Seidel.......... | 333/11 X |

*Primary Examiner*—Roy Lake
*Assistant Examiner*—Lawrence J. Dahl
*Attorneys*—Cyril A. Krenzer, K. Mullerheim, B. E. Franz and Glenn H. Antrim

ABSTRACT: A phase equalizer has a portion with two channels; an incoming signal is split into two signals for application to the channels so that the phase of the signals differ by 180° and the ratio of their amplitudes is 2:1. The channel with the signal of greater amplitude includes an adjustable resonant circuit for changing phase of its signal, and the signals of both channels are recombined in a succeeding adder circuit. By simply adjusting the resonant circuit, the phase characteristic of the equalizer can be changed readily without changing the amplitude characteristics.

INVENTOR
ANGELO F. RICAGNI
BY Glenn H. Antrim
ATTORNEY

PATENTED JUN 15 1971

3,585,516

ALL PASS NETWORK FOR PHASE EQUALIZERS OF WIDE BAND COMMUNICATION SYSTEMS

This invention refers to all-pass networks used particularly in high capacity communication systems.

In order to understand better the usefulness of this invention, some principles concerning the question of "phase equalization networks" will be reviewed briefly. All conventional electric networks have a "phase vs. frequency" characteristic which is related to the "amplitude vs. frequency" characteristic; it is difficult if not impossible to alter one of them without modifying the other.

The all-pass network has a particular "phase vs. frequency" characteristic; whereas the "amplitude" characteristic is constant for it is independent of change in frequency. As a result, the addition of an all-pass network to the conventional networks alters only the "phase vs. frequency" characteristic without altering the "amplitude" characteristic. It is thus possible to phase "equalize" a predetermined network by altering the phase characteristic thereof by addition of all-pass networks until a desired overall characteristic is obtained.

Figure 1:
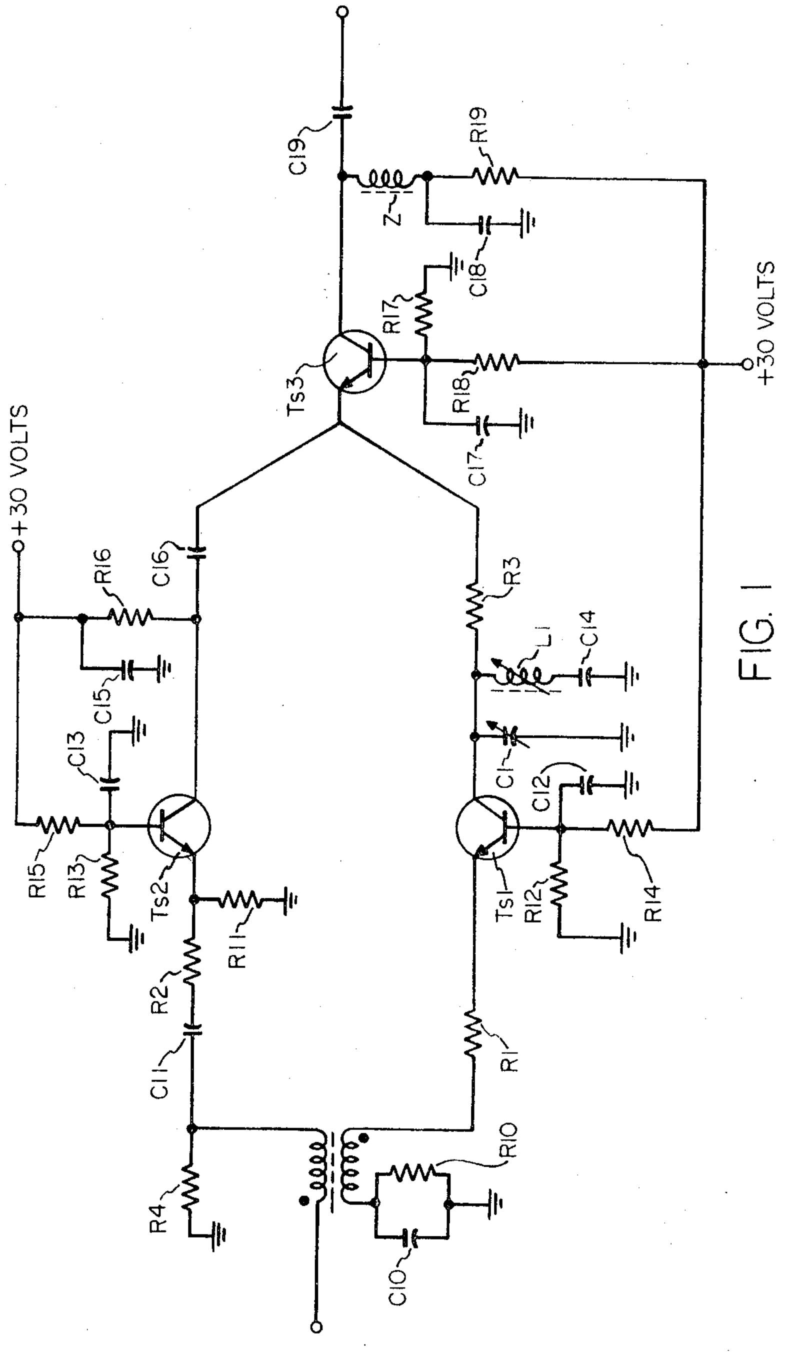
Figure 2:
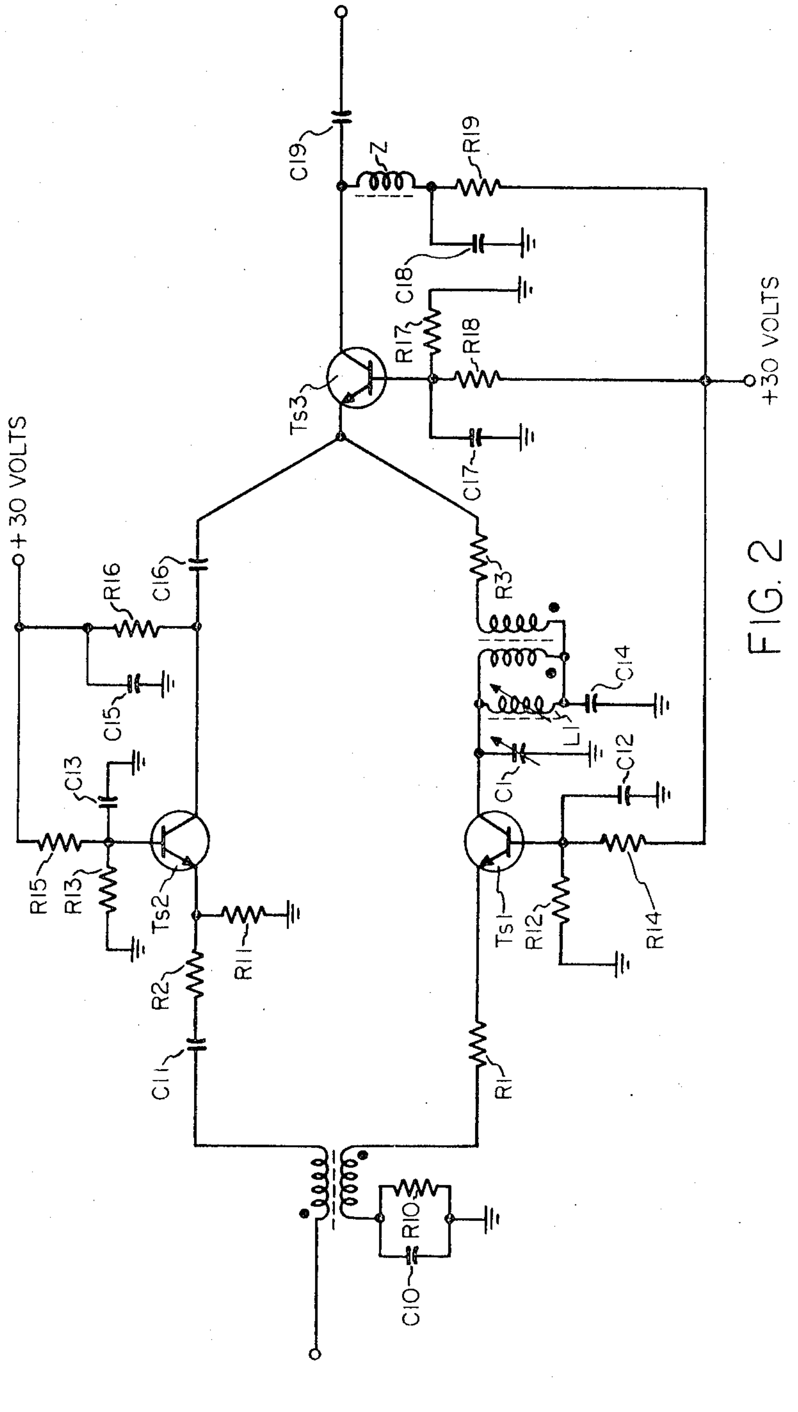
Figure 3:
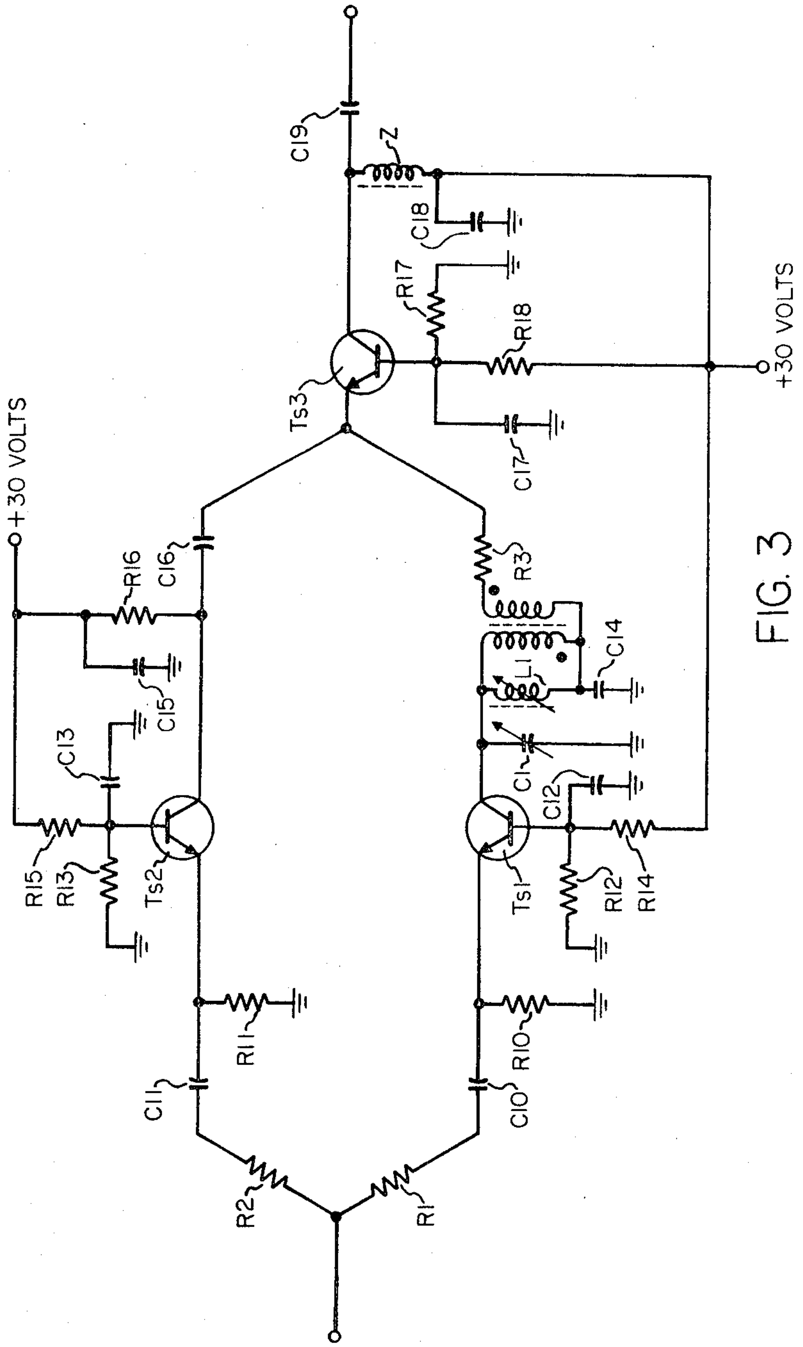
Figure 4:
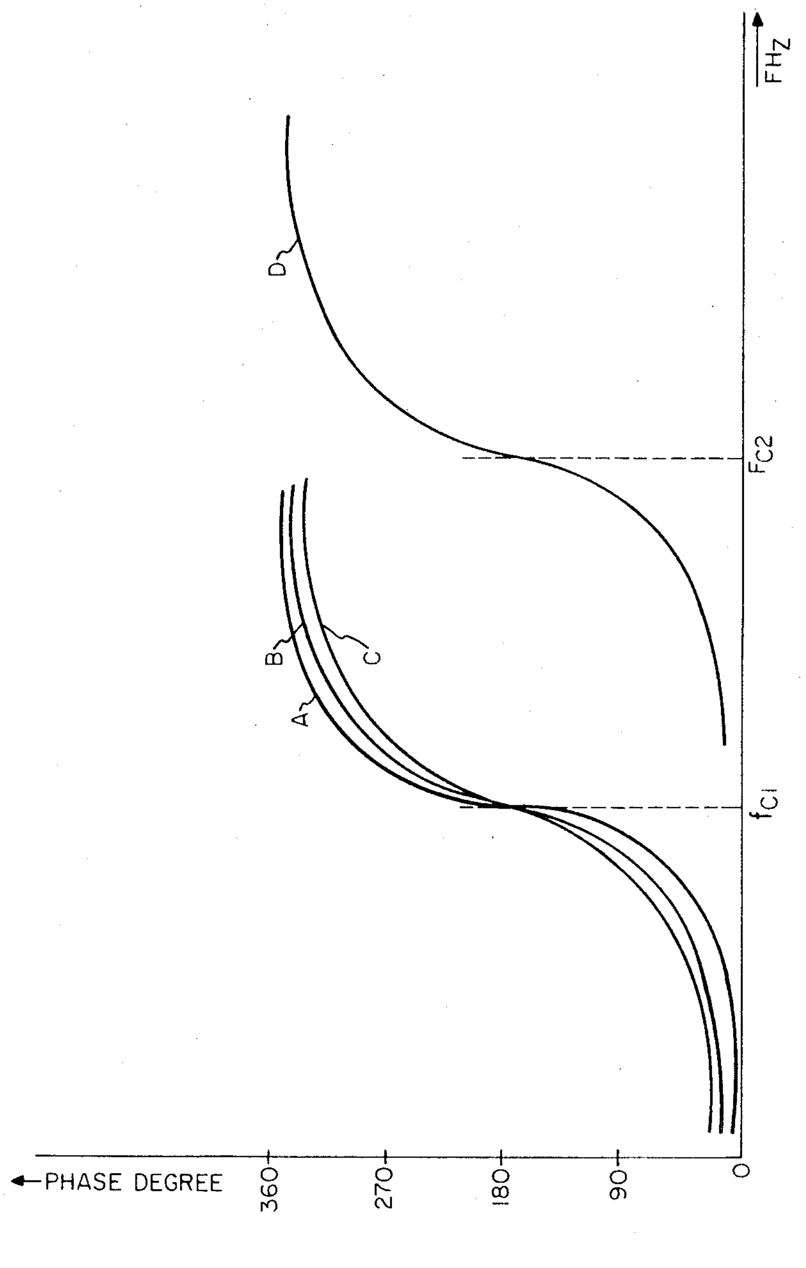

FIGS. 1, 2 and 3 are schematic diagrams of different embodiments of this invention; and FIG. 4 is a diagram of phase vs. frequency curves of all-pass circuits.

Each of the curves of FIG. 4 is identified normally by two parameters, i.e. "the center band frequency" and "the slope vs. frequency". For example, in FIG. 4 the curves A, B, C differ from each other only in the slope, whereas the curve D differs from C in the slope and center band frequency.

The conventional all-pass networks provided with passive components consist, as is well known, of lattice networks for symmetrical lines which can be converted into bridged T-networks for asymmetrical lines. These networks have at least four or five components whose parameters must have a definite value to have a desired phase-frequency characteristic and a constant amplitude-frequency characteristic. If it is desired to change one or both the characteristic parameters of the phase, it is necessary to readjust all component values. The accuracy with which these components are measured or adjusted conditions the approximation with which the network can be considered an "all-pass" network, i.e. with a constant amplitude vs. frequency characteristic.

In the construction of the all-pass network the following principle is normally followed:

a. The "phase vs. frequency" characteristic of the networks to be equalized is measured and calculated.
b. Knowing what "phase vs. frequency" characteristic is desired, the difference between it and the actual characteristic as considered under (a) is determined.
c. It is calculated which and how many all-pass networks combined with each other have a phase characteristic which is appreciably the same as the difference considered under (b).
d. Knowing on the basis of the calculations under (c) how many all-pass networks is required, each characterized by a particular value of center band frequency and slope vs. frequency, the values of the components of each all-pass network are determined, and the networks are constructed.
e. The phase characteristics of the individual all-pass networks and the sum of such characteristics are measured; it is checked whether their "amplitude vs. frequency" characteristic is actually constant; and finally it is determined whether the sum of the phase characteristics of the network to be equalized and the phase of the equalizers is that desired.

In performing the above-described operations the difficulty is encountered that the mass produced networks to be equalized differ from each other by a certain quantity, and the all-pass networks which should equalize them are manufactured with a certain tolerance, whereby if the all-pass networks are used without readjustments, an unsatisfactory phase equalization is obtained as a result. It is therefore necessary to change slightly the phase characteristics of the all-pass networks to obtain a satisfactory final equalization. It has been seen hereinbefore that in order to change the phase characteristic of the all-pass networks and still to keep the amplitude characteristic constant it is necessary to adjust four to six components. In practice this is a tentative operation which is carried out by measuring both the phase and amplitude characteristic. This operation is time consuming and requires the use of several instruments.

The object of this invention is to provide an "all-pass" network with only two variable elements, i.e. a condenser and a coil to be adjusted to change the center band frequency and slope of the phase characteristic while the amplitude characteristic remains unchanged and constant with the frequency, as appears from the hereinafter described equation (6). In practice the equalization operation is made easier by the fact that only two instead of four or six components are to be changed, and only the phase characteristic but not the amplitude characteristic has to be measured.

More particularly the "all-pass network" according to this invention is characterized in that it includes a splitting network having one input and two outputs, two amplifying channels, one of which is aperiodic with untuned or constant phase characteristics, and the other selective, with variations in phase characteristics controlled by adjustable impedance elements each of the amplifying channels having only a common base transistor connected to one of the outputs of the splitting network, and an adder connected to the output of the two channels. The overall gain of the selective amplifier is twice the gain of the aperiodic amplifier, and an inverter is included in the system in such a manner that at the adder circuit the phases of the signals from the two amplifiers are opposite at the center band frequency of the selective amplifier.

The above-mentioned characteristics are provided as follows:

For the circuit in FIG. 1 the splitting network and the phase inverter are combined into a single circuit by using a transformer with a turns ratio of 1:1 to couple from an unbalanced input circuit to a balanced input arrangement of the two amplifying channels and the gain of the two channels is provided by making the two input resistors $R_1$ and $R_2$ at the emitters of the transistors TS1 and TS2 different so that $2(R_1+R_{el})$ $(R_2+R_{e2})$ where $R_{el}$ and $R_{e2}$ are the input resistances of the transistors TS1 and TS2. In the circuit of FIG. 2 the splitting network and the phase inverter are combined into a single circuit also having a transformer with a ratio of 1:1, and the different gain in the two channels is obtained by using another transformer between the collector of TS1 and the emitter of TS3 which does not reverse the phase. The transformer has a 2:1 turn ratio to double the current of TS1 and to halve the voltage.

By giving to $R_3+R_{e3}$ (where $R_{e3}$ is the input resistance of TS3) a value equal to one-fourth of the corresponding value in FIG. 1, the current entering TS3 from TS1 is twice that from TS2 (at the resonant frequency of LC).

In the circuit in FIG. 3 the splitting network consists of two resistors, and the phase reversal of the signal is provided by the phase inverter transformer between the collector of TS1 and the emitter of TS3. If the two resistors of the splitting network are equal, the change in gain will be provided by using a transformer with a turns ratio of 2:1. If the values of the resistors are different, the transformer may have a 1:1 turns ratio. The selectivity for all three circuits is provided by a simple resonating circuit. The load impedance Z of TS3 can be either an interstage circuit to be connected to a subsequent transistor or a matching circuit of a constant impedance line.

It will be shown now that the network in FIG. 1 is an "all-pass network" having an "amplitude vs. frequency" characteristic that is constant and a "phase vs. frequency" characteristic that changes with frequency. A similar demonstration could be made also for the networks in FIGS. 2 and 3.

It is seen that an input coupling transformer supplies two amplifier stages with voltages having the same amplitude but opposite phase. Two resistors $R_1$ and $R_2$ supply to two transistors, TS1 and TS2, two currents, one of which is double in magnitude with respect to the other.

The output current from the collector of TS2 enters directly the emitter of TS3, whereas the output current from TS1 flows first into the resonant circuit and then reaches the emitter of TS3, through the resistor $R_3$. Let the input voltage be V, then the input currents $I_1$ and $I_2$ in the transistors TS1 and TS2, are:

$$V/\ 2R_1+R_{el})=I_1 \qquad (1)$$

$$V/\ -2(R_2+R_{e2}=I_2$$

Currents in the emitters are assumed to be identical with the currents in the collectors. Let:

$$2(R_1+R_{el})=(R_2+R_{e2})=R_4 \qquad (2)$$

$$-I_1 2I_2 \qquad (3)$$

At the same time $R_4$ ensures the symmetry of the transformer and its matching to the line impedance.

The current $I_4$ in the resistor $R_3$ is given by the expression:

$$I_4=Z_1I_1/\ R_3+R_{e3} \qquad (4)$$

where $Z_1$ is the resultant impedance of the parallel circuit of $C$, $L$, $(R_3+R_{e3})$.

The total current in TS3 (FIG. 1) is:

$$I_4+I_2=\frac{ZI_1}{R_3+R_{e3}}-\frac{I_1}{2}= \qquad (5)$$

$$I_3=\frac{I_1}{2}\frac{R_3+R_{e3}-\omega^2LC(R_3+R_{e3})-j\omega L}{R_3+R_{e3}-\omega^2LC(R_3+R_{e3})+j\omega L} \qquad (6)$$

It results from this expression that the module of the expression in the numerator is the same as that in the denominator, i.e. the amplitude of $I_3$ is always equal to $I_1$ independently of the frequency and the value of $L$ and $C$. Since $I_3$ is the output signal from the circuit under consideration, it results that the amplitude of the output signal is constant with frequency, and therefore the network is an all-pass network and keeps such for all values of $L$ and $C$. The phase of $I_3$, as it results from the expression (6), changes only with frequency and with the values of $L$ and $C$. Therefore, the amplitude does not change with change in $L$ and $C$, and only the phase characteristic changes as it was desired to show.

The only approximation in the calculation consists in assuming that the emitter current and the collector current of the common base transistors are the same. In practice, good results were obtained with such an assumption inasmuch as this error in TS1 is offset by a similar error in TS2.

The parasitic parameters of the network cause practically no trouble, or in any case they can be offset. In fact the output resistance of TS1 is parallel connected to $R_3$; it shunts a small current in phase with $R_3$ and is offset by finely adjusting the ratio $R_1/R_2$, the output capacity of the said transistor being included in the $C$ of the resonant circuit.

The output resistance of TS2 and the bias resistor R16 have a high value and operate in parallel to the low input impedance of TS3 and therefore do not cause appreciable errors. The bias resistor $R_{11}$ has a high value and operates in parallel to the low input impedance of TS2 and therefore introduces negligible error. Anyway, the errors introduced by $R_{16}$, $R_{11}$ and the output resistance of TS2 are also adapted to be offset by suitably adjusting the resistor ratio $R_1/\ R_2$.

It will be seen that the invention essentially consists in splitting the signal into two channels and in using amplifier stages with only common base transistors.

While but some embodiments of the invention have been shown, it is obvious that many changes and modifications can be made, without departing from the scope of the invention.

I claim:

1. An all-pass network for wideband communication systems comprising:

first and second amplifier channels, an input splitting network, an adder circuit, each of said amplifier channels being connected between said input splitting network and said adder circuit, said input splitting network having first and second circuits and an input terminal, said first and second circuits of said input splitting network being included in the input circuits of said first and second amplifier channels respectively, said splitting network dividing signal current applied to said input terminal in a predetermined ratio between its first and second circuits for application to said first and second amplifier channels respectively, said first amplifier channel having substantially constant phase characteristics for signal over an operating band of frequencies to be applied to said input terminal, said second amplifier channel having adjustable impedance means to provide phase equalization, the output of each of said amplifier channels being connected to the input of said adder circuit, the gain of said second amplifier channel being twice the gain of said first amplifier channel as measured between said input terminal and the input of said adder circuit, means for inverting phase included in one of said amplifier channels to provide at the center frequency of said operating band of frequencies phase difference of 180° between the signals applied from said amplifier channels to said adder circuit, and an output circuit connected to said adder circuit, the amplitude of the signal in said output circuit being independent of the adjustment of said adjustable impedance means.

2. An all-pass network as claimed in claim 1 wherein said input splitting network and said means for inverting phase comprise a transformer, said first and second circuits of said input splitting network being first and second windings of said transformer, said first and second windings having a 1:1 turns ratio and being connected to provide said phase difference of 180°, and a resistor in each of said input circuits of said amplifier channels, said resistors having different values required to provide said gain of 2:1

3. An all-pass network as claimed in claim 1 wherein said input splitting network and said means for inverting phase comprise a transformer, said first and second circuits of said input splitting network being first and second windings of said transformer, said first and second windings having a turns ratio of 1:1 and being connected to provide said phase difference of 180°, another transformer connected between the output of said second amplifier channel and said input of said adder circuit, said other transformer providing said difference in gains of said amplifier channels and being connected to provide signal without appreciable change in phase between its input and its output.

4. An all-pass network as claimed in claim 1 wherein said input splitting network comprises first and second resistors connected in said input circuits of said first and second amplifier channels respectively, said resistors having different values to provide said difference in gains of said amplifier channels, and said means for inverting phase is a transformer having a turns ratio of 1:1 connected between the output of said second amplifier channel and said input of said adder circuit.

5. An all phase network as claimed in claim 1, wherein said input splitting network comprises first and second resistors with similar values connected in said input circuits of said first and second amplifier channels respectively, and said means for inverting phase is a transformer having a ratio of 2:1 connected between the output of said second amplifier channel and said input of said adder circuit, said transformer providing said difference in gains of said amplifier channels.

6. An all phase network as claimed in claim 1, wherein said first and second amplifier channels include first and second transistors, respectively, each transistor having an emitter, a base, and a collector, said transistors being connected as common base amplifiers, the emitter of said first transistor and the emitter of said second transistor being coupled to said first and second circuits of said input splitting network respectively, the collector of said first transistor having a resistive load and being coupled to said input of said adder circuit, the collector of said second transistor being connected to said adjustable impedance means and also to said input of said adder circuit.